US012502890B2

(12) United States Patent
Ito et al.

(10) Patent No.: US 12,502,890 B2
(45) **Date of Patent: *Dec. 23, 2025**

(54) INK-JET RECORDING APPARATUS

(71) Applicant: Brother Kogyo Kabushiki Kaisha, Nagoya (JP)

(72) Inventors: Tsuyoshi Ito, Nagoya (JP); Yuji Koga, Nagoya (JP); Wataru Sugiyama, Nishio (JP); Kenji Samoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 5 days.

This patent is subject to a terminal disclaimer.

(21) Appl. No.: 18/298,120

(22) Filed: Apr. 10, 2023

(65) Prior Publication Data

US 2023/0356528 A1 Nov. 9, 2023

Related U.S. Application Data

(60) Continuation of application No. 15/185,790, filed on Jun. 17, 2016, now Pat. No. 11,648,776, which is a continuation of application No. 14/138,082, filed on Dec. 22, 2013, now Pat. No. 9,387,704, which is a division of application No. 13/629,937, filed on Sep. 28, 2012, now Pat. No. 8,636,352.

(30) Foreign Application Priority Data

Nov. 28, 2011 (JP) ................................ 2011-259496

(51) Int. Cl.

| | |
|---|---|
| ***B41J 2/14*** | (2006.01) |
| ***B41J 11/00*** | (2006.01) |
| ***B41J 11/02*** | (2006.01) |

(52) U.S. Cl.

CPC .......... *B41J 2/1433* (2013.01); *B41J 11/005* (2013.01); *B41J 11/02* (2013.01)

(58) Field of Classification Search

None

See application file for complete search history.

(56) References Cited

U.S. PATENT DOCUMENTS

| | | | |
|---|---|---|---|
| 5,065,169 A | 11/1991 | Vincent et al. | |
| 5,527,123 A | 6/1996 | Jackson et al. | |
| 5,645,361 A | 7/1997 | Mitsushima et al. | |
| 5,684,516 A * | 11/1997 | Cseledy .............. | B41J 25/3082 347/8 |

(Continued)

FOREIGN PATENT DOCUMENTS

| | | |
|---|---|---|
| JP | H04-69264 A | 3/1992 |
| JP | H11-138923 A | 5/1999 |
| JP | 2000-071532 A | 3/2000 |

*Primary Examiner* — Alejandro Valencia

(74) *Attorney, Agent, or Firm* — Banner & Witcoff, Ltd.

(57) ABSTRACT

There is provided an ink-jet recording apparatus which includes a recording portion, and a contact portion configured to come into contact with an upper surface of the sheet. The contact portion has a storage portion provided on a side of the recording portion and configured to store an ink, and a protruding portion is provided between both ends in a width direction intersecting the transporting direction of the storage portion, and which is protruded toward the recording section, and an upper end of the protruding portion is the highest in the contact portion.

13 Claims, 13 Drawing Sheets

(56) References Cited

U.S. PATENT DOCUMENTS

| | | | | |
|---|---|---|---|---|
| 5,993,094 | A | 11/1999 | Lee | |
| 6,129,461 | A | 10/2000 | Nakai | |
| 6,250,731 | B1 * | 6/2001 | Hashimoto | B41J 25/3082 347/8 |
| 6,883,909 | B2 * | 4/2005 | Kanazawa | B41J 11/005 347/104 |
| 7,591,552 | B2 * | 9/2009 | Takeshita | B41J 3/4071 346/134 |
| 8,636,352 | B2 * | 1/2014 | Ito | B41J 11/02 347/101 |
| 2006/0066670 | A1 | 3/2006 | Kang | |
| 2009/0189948 | A1 | 7/2009 | Nakata | |
| 2015/0124022 | A1 | 5/2015 | Luedeman et al. | |

* cited by examiner

INK-JET RECORDING APPARATUS

REFERENCE TO RELATED APPLICATIONS

The present application is a continuation of prior U.S. application Ser. No. 15/185,790, filed on Jun. 17, 2016, which is a continuation of prior U.S. application Ser. No. 14/138,082, filed on Dec. 22, 2013, now U.S. Pat. No. 9,387,704, which is a divisional application of prior U.S. application Ser. No. 13/629,937, filed on Sep. 28, 2012, now U.S. Pat. No. 8,636,352, which claims priority from Japanese Patent Application No. 2011-259496, filed on Nov. 28, 2011, the disclosure of which is incorporated herein by reference in its entirety.

BACKGROUND ART

An ink-jet recording apparatus which includes a platen which supports a sheet transported in a transporting direction (hereinafter, 'transporting direction'), and which carries out image recording by jetting ink droplets from a recording section onto a sheet on the platen, has hitherto been known. In such type of ink-jet recording apparatuses, there is an apparatus which includes a contact portion which suppresses or inhibits lifting off of a sheet from the platen. The contact portion is arranged between the platen and the recording section, and suppresses the lifting-off of a sheet from the platen by contacting with the sheet which is transported.

DESCRIPTION

Reducing a distance between the platen and the recording section shortens a distance between the sheet on the platen and the recording section, and an accuracy of image recording is improved. However, when the distance between the platen and the recording section is made smaller, the contact portion comes closer to the recording section. As the contact portion comes closer to the recording section, there is a possibility of the contact portion and the recording section making a contact. Sometimes, ink is adhered to the recording section by ink mist etc. When the ink is adhered to the recording section, the ink is adhered to the contact portion due to the contact between the recording section and the contact portion. As the ink is adhered to the contact portion, the ink moves to a rear surface of the platen from a side of the recording section upon running down a front surface of the contact portion, and makes the sheet dirty.

The present teaching is made in view of the abovementioned circumstances, and an object of the present invention is to provide an ink-jet recording apparatus in which it is possible to suppress the ink adhered to the contact portion from flowing toward the platen.

According to an aspect of the present teaching, there is provided an ink-jet recording apparatus includes: a roller pair, a rotating shaft, a recording portion, a platen, a plate-shaped portion and a portion including a first portion and a second portion.

The roller pair is configured to nip a sheet therebetween at a nip point and transport the sheet in a transporting direction, the roller pair includes a first roller having a rotational axis located above the nip point in an up down direction, and a second roller having a rotational axis located below the nip point in the up down direction.

The rotating shaft is a shaft for rotating the first roller.

The recording portion includes a head in which nozzles that discharge ink are open, the recording portion being provided downstream of the nip point of the roller pair in the transporting direction.

The platen is in a form of a plate, the platen is provided below the recording portion and downstream of each roller of the roller pair in the transporting direction. The platen is configured to support the sheet and is spaced from the recording portion in an up-down direction orthogonal to the transporting direction and parallel to a direction of a thickness of the plate.

The plate-shaped portion is positioned in a gap between the recording portion and the platen. The sheet is transported between a lower surface of the plate-shaped portion and the platen.

The portion includes the first portion located above the rotational axis of the first roller in the up down direction and the second portion connecting the first portion and an upstream end of the plate-shaped portion. The first portion overlaps a portion of the first roller in the up down direction, and the second portion overlaps a portion of the first roller in the up down direction from a position above the rotational axis of the first roller to a position below the rotational axis of the first roller. The first portion and the second portion are formed integrally.

The plate-shaped portion is attached to a member other than the recording portion.

The plate-shaped portion includes a protruding portion positioned at the gap.

The protruding portion protrudes in the up-down direction and is configured to contact the recording portion.

The protruding portion is positioned upstream of a downstream end of the plate-shaped portion in the transport direction.

An upper end of the protruding portion is located higher than the downstream end of the plate-shaped portion.

The recording portion further includes: a carriage to which the head is mounted, the carriage configured to move away from the plate-shaped portion; and a lower surface that is parallel to the platen and orthogonal to the direction of the thickness of the plate, the lower surface including first and second ends in the transporting direction.

The protruding portion of the plate-shaped portion is located between the first and second ends of the lower surface of the recording portion in the transporting direction.

BRIEF DESCRIPTION OF THE DRAWINGS

FIG. 5A is a plan view, FIG. 5B is a left-side view, FIG. 5C is a front view, FIG. 5D is a right-side view, FIG. 5E is a perspective view, and FIG. 5F is a bottom view;

FIG. 7A is a plan view, FIG. 7B is a left-side view, FIG. 7C is a front view, FIG. 7D is a right-side view, FIG. 7E is a perspective view, and FIG. 7F is a bottom view.

FIG. 12A is a cross-sectional view of the platen 50 orthogonal to the frontward-rearward direction 8, FIG. 12B is a vertical cross-sectional view of the platen 50 which is at a first position, FIG. 12C is a vertical cross-sectional view of the platen 50 which is a position between the first position and a second position, and FIG. 12D is a vertical cross-sectional view of the platen 50 which is at the second position.

FIG. 13A depicts a third position and FIG. 13B depicts a fourth position.

DETAILED DESCRIPTION OF THE EMBODIMENTS

Figure 1:
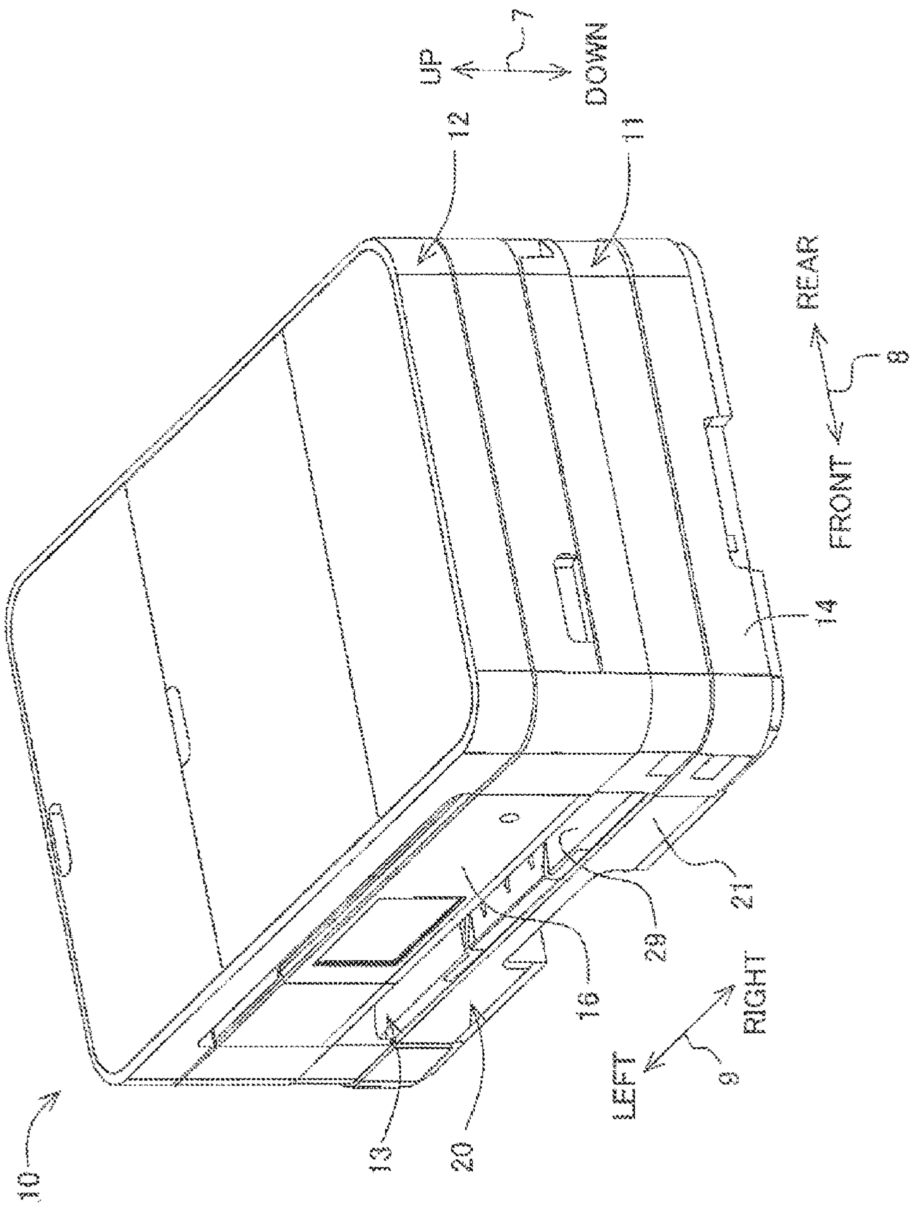
FIG. 1 is a perspective view of an ink-jet recording apparatus 10.

An exemplary embodiment of the present teaching will be described below. However, the embodiment described below is an example of the present teaching, and appropriate (various) changes may be made in the embodiment, without departing from the scope of the present teaching. In the following description, as depicted in FIG. 1, a vertical direction 7 is defined based on a state in which an ink-jet recording apparatus is usably installed. Moreover, an operation panel 16 is provided to a side surface of the ink-jet recording apparatus 10, and a front-rear direction 8 is defined with the side surface to which the operation panel 16 is provided, as a front surface of the ink-jet recording apparatus 10. A left-right direction 9 is defined upon viewing the ink-jet recording apparatus 10 from a front-surface side.

<Outline of Ink-Jet Recording Apparatus 10>

As depicted in FIG. 1, the ink-jet recording apparatus 10 includes a printer section 11 which records an image on a sheet 6 (FIG. 2) such as a recording paper, a glossy paper, and a postcard, and a scanner section 12 which fetches an image recorded on a document (not depicted in the diagram), and is capable of realizing (functions such as) print, scan, and copy. In a case in which the ink-jet recording apparatus according to the present teaching has a printer section which records an image etc. on a sheet by jetting an ink, the ink-jet recording apparatus is not necessarily required to have the scanner section 12. In other words, the scanner section 12 has an arbitrary structure (composition), and a detail explanation thereof is omitted.

<Outline of Printer Section 11>

Figure 2:
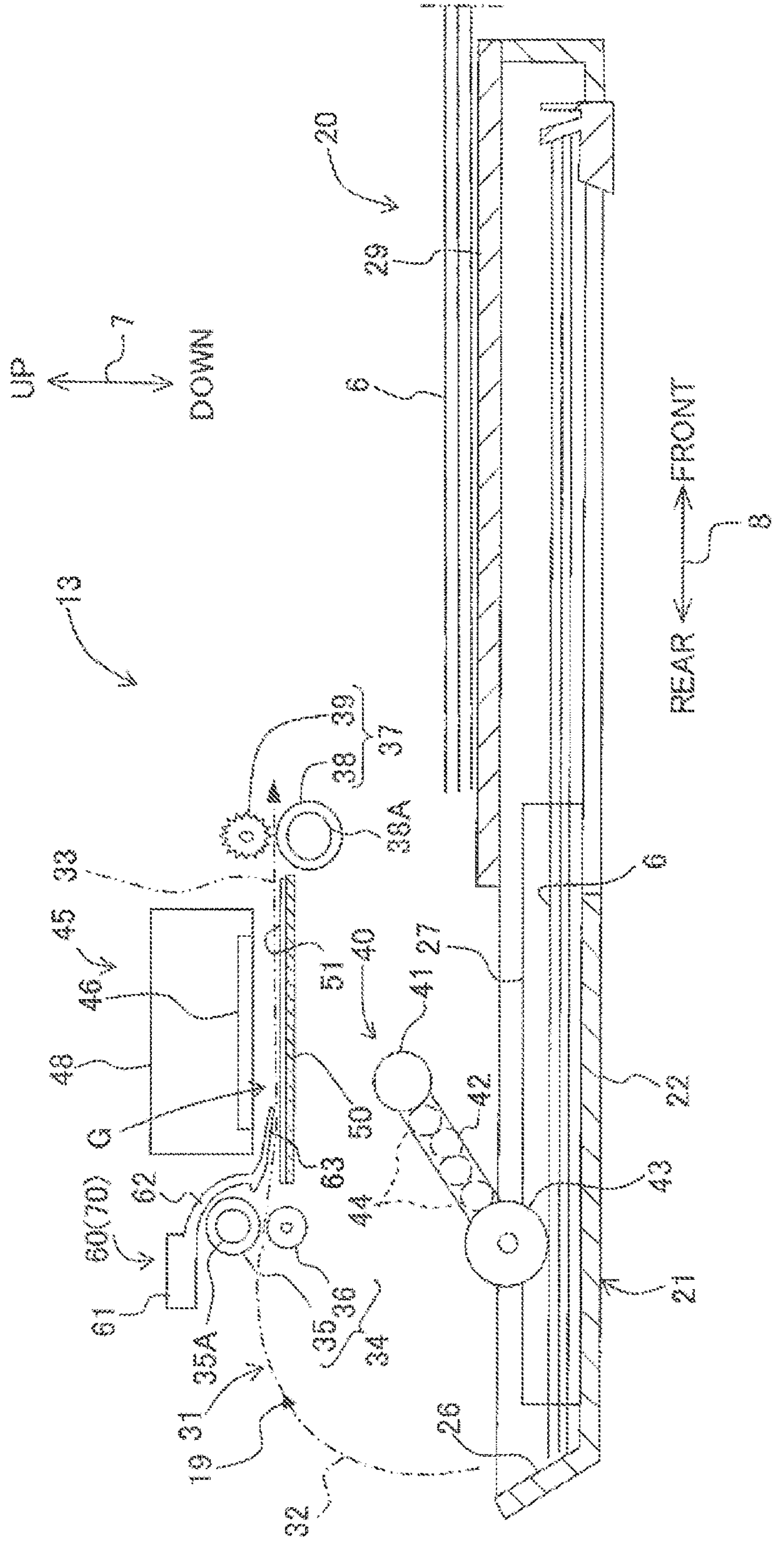
FIG. 2 is a schematic cross-sectional view of a main body 13.

As depicted in FIG. 1, the printer section 11 includes a main body 13 and a paper feeding cassette 20 which is accommodated at a lower portion of the main body 13. As depicted in FIG. 2, a sheet 6 is placed on the paper feeding cassette 20. Inside a casing 14 of the main body 13 (FIG. 1), a feeding section 40, a transporting path (channel) 31, a pair of transporting rollers 34, a pair of paper discharging rollers 37, contact members 60 and 70, and a recording section (recording portion) 45 depicted in FIG. 2 are provided. In the main body 13, the sheet 6 is fed to the transporting path 31 by the feeding section 40, and the sheet 6 which has been fed is transported by the pair of transporting rollers 34. The sheet 6 which is transported is held (pressed) by the contact members 60 and 70, and image recording is carried out by jetting ink droplets from the recording section 45 onto the sheet 6 which is held. The sheet 6 having an image recorded thereon is discharged by the pair of paper discharging rollers 37 to a paper discharging tray 29 of the paper feeding cassette 20. Various components of the printer section 11 will be described below.

<Casing 14>

As depicted in FIG. 1, the casing 14 has on a front surface in the front-rear direction 8, an opening (insertion slot) 15 into which or from which the paper feeding cassette 20 is inserted or removed. The paper feeding cassette 20 is slidable in the front-rear direction 8 from the opening 15.

<Paper Feeding Cassette 20>

As depicted in FIG. 1, the paper feeding cassette 20 is accommodated at a lower portion of the casing 14, and is slidable in the front-rear direction 8. As depicted in FIG. 2, the paper feeding cassette 20 includes a main tray 21 which holds the sheet 6 before an image being recorded thereon, and the paper discharging tray 29 which receives the sheet 6 after an image is recorded thereon. The paper discharging tray 29 is arranged at an upper side (above) the main tray 21, and is supported by the main tray 21.

As depicted in FIG. 2, the main tray 21 includes a bottom plate 22 on which the sheet 6 is placed, and an inclined plate 26 which is extended to be inclined upward in a rearward direction from a rear end of the base plate 22 in the front-rear direction 8. The inclined plate 26 guides the sheet 6 sent from the feeding section 40 to the transporting path 31. The bottom plate 22 is provided with a side guide mechanism 27 which positions the sheet 6 by centering and suppresses the sheet 6 sent by the feeding section 40 from passing obliquely. The centering mechanism positioning by making a center in the left-right direction 9 (a direction perpendicular to a paper surface of FIG. 2) of sheet 6 of various sizes coincide with a center of the bottom plate 22 in the left-right direction 9.

<Feeding Section 40>

As depicted in FIG. 2, the feeding section 40 includes a spindle 41 which is rotatably supported by a frame which is not depicted in the diagram, an arm 42 which is extended to be inclined downward in a rearward direction from the spindle 41, and of which one-end portion is pivotably supported by the spindle 41, and a feeding roller 43 which is pivotably (rotatably) supported by the other-end portion of the arm 42. The arm 42 is provided with a plurality of gears 44 which transmits the rotation of the spindle 41 to the feeding roller 43.

As the spindle 41 is rotated by a drive motor which is not depicted in the diagram, the arm 42 is rotated integrally with the spindle 41 due to a force of friction with the spindle 41, and the feeding roller 43 contacts with the sheet 6 on the main tray 21. Moreover, the feeding roller 42 is rotated by the spindle 41 via the gears 44. As the feeding roller 42 rotates, the sheet is sent rearward in the front-rear direction 8. The sheet 6 which has been sent is guided to the transporting path 31 by the inclined plate 26 of the main tray 21.

<Transporting Path 31>

As depicted in FIG. 2, the transporting path 31 is a path through which the sheet 6 is transported, and is demarcated by a platen 50 and a plurality of guide members not depicted in the diagram. The transporting path 31 has a curved path 32 depicted by an alternate dot and dash line, and a straight path 33 depicted by alternate two dots and dash line. The curved path 32 is directed upward with an upper end of the inclined plate 26 of the main tray 21 as a base end, and upon being curved, is extend frontward in the front-rear direction 8. The straight path 33 is extended frontward in a straight line, in the front-rear direction 8 from a tail end of the curved path 32. A lower surface of the straight path is demarcated by the platen 50.

<Platen 50>

Figure 4:
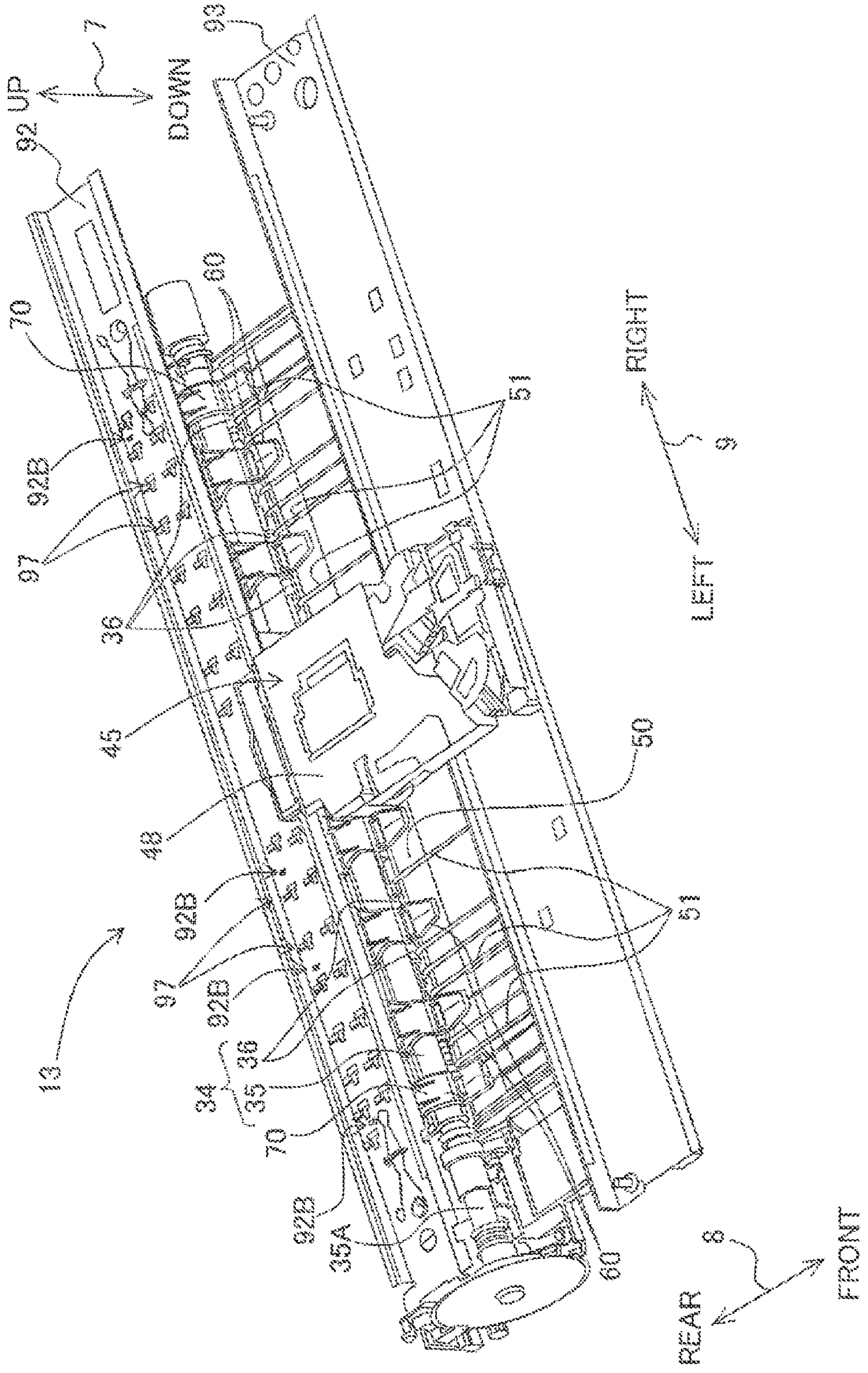
FIG. 4 is a perspective view of a part of the main body 13.

As depicted in FIG. 2, the platen 50 is in the form of a plate of which a thickness direction is parallel to the up-down direction 7, and is arranged at an upper side of the paper feeding cassette 20. As depicted in FIG. 4, a plurality of supporting ribs 51 which supports the sheet 6 is projected or protruded upward from an upper surface of the platen 50. The supporting ribs 51 are provided to be extended in the front-rear direction 8 to be able to support the transported sheet 6. Moreover, the supporting ribs 51 are isolated mutually in the left-right direction 9, and are arranged at positions which are bilaterally symmetrical with a central portion of the platen 50 in the left-right direction 9 as a point of symmetry. Such an arrangement is for supporting the sheet 6 of various sizes which has been positioned by centering by the side guide mechanism 27, at bilaterally symmetrical positions.

<Guide Rails 92 and 93>

As depicted in FIG. 4, a pair of guide rails 92 and 93 at a front side and a rear side of recording section 45 which is installed is arranged at an upper side of the platen 50. The guide rails 92 and 93 are formed of steel plates extended in the left-right direction 9. The guide rail 92 at a rear side in the front-rear direction 8 and the guide rail 93 at a front side (in the front-rear direction 8) are arranged to be isolated in the front-rear direction 8. Two ends in the left-right direction of the guide rails 92 and 93 are supported by a frame which is not depicted in the diagram. The guide rails 92 and 93 support the recording section 45 which has been installed, such that the recording section 45 is capable of reciprocating in the left-right direction 9.

Figure 8A:
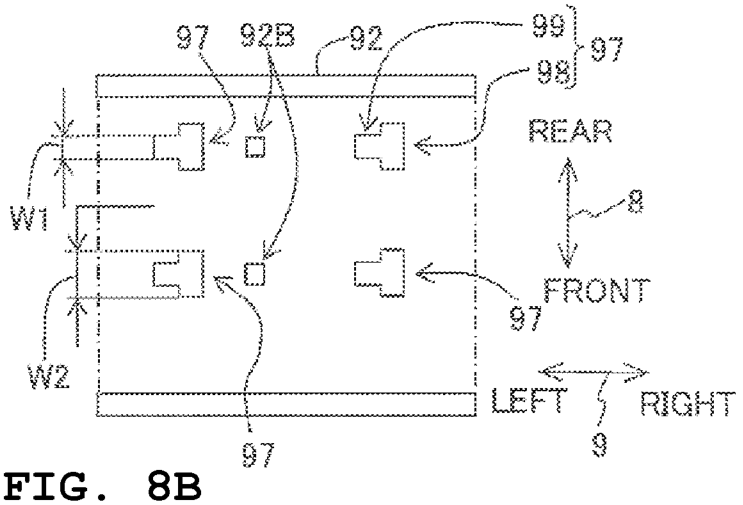
FIG. 8A is a plan view of a portion of a guide rail 92.
Figure 8B:
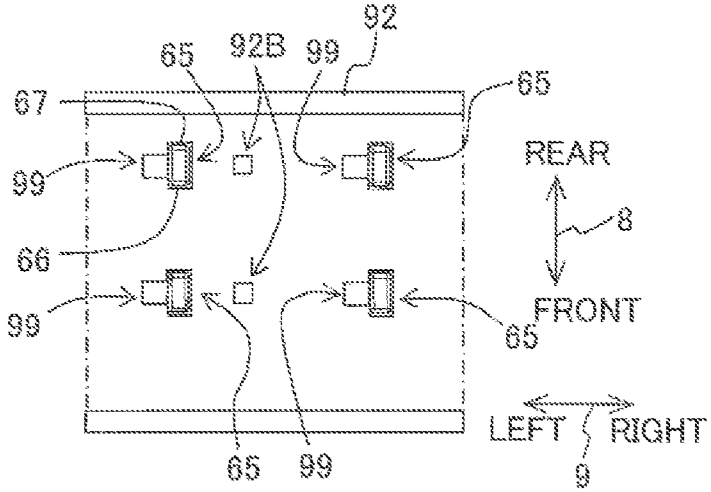
FIG. 8B is a diagram showing a state in which a protruding insert 65 is inserted through a first hole 98.
Figure 8C:
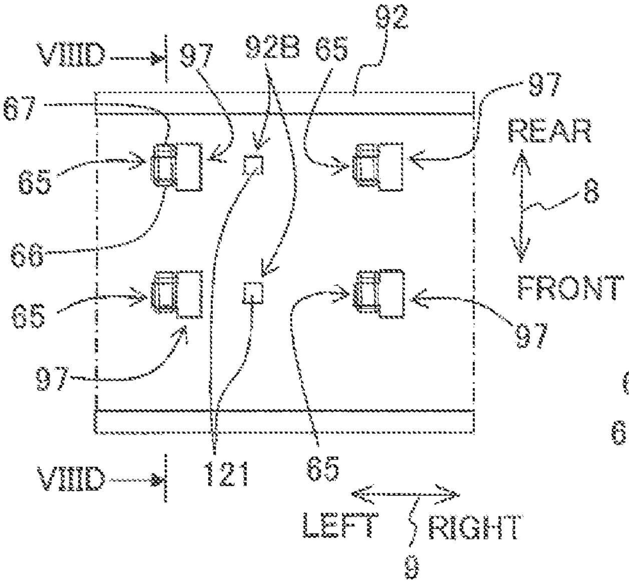
FIG. 8C is a diagram showing a state in which, the contact member 60 is fixed to the guide rail 92.
Figure 8D:
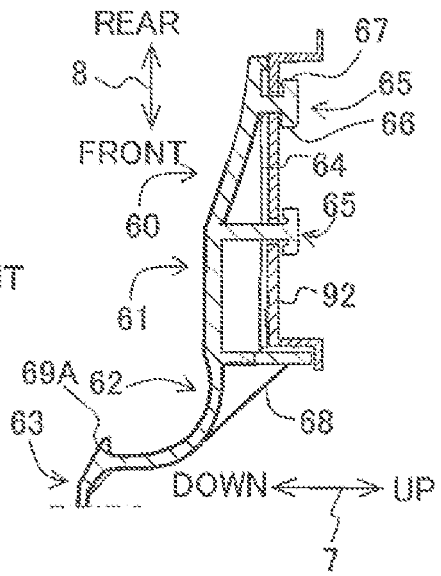
FIG. 8D is a cross-sectional view along a line VIIID-VIIID in FIG. 8C.

As depicted in FIG. 4, FIGS. 5A to 5F, and FIGS. 7A to 7F, the guide rail 92 is provided with a plurality of insertion holes (keyways) 97 into which protruding inserts 65 and 75 of the contact members 60 and 70 which will be described later are to be inserted. As depicted in FIG. 8A, a first hole 98 which is extended in the front-rear direction 8 and a second hole 99 which is extended leftward in the left-right direction 9 from a central portion of the first hole 98 in the front-rear direction 8 are formed in the insertion hole 97. The protruding inserts 65 and 75, as depicted in FIG. 8B, after being inserted through the first hole 98 from a lower side of the guide rail 92, are moved leftward in the left-right direction, and are fitted into the second hole 99 as depicted in FIG. 8C and FIG. 8D.

As depicted in FIG. 4, the guide rail 92 is provided with a plurality of latching holes 92B which latches the contact members 60 and 70 in the left-right direction. One contact member 60 (contact member 70) is provided with one latching hole 92B. In FIG. 4, only some of the latching holes 92B are assigned reference numerals. The latching holes 92B are provided at positions which are intermediate between the two insertion holes 97 at a rear side in the front-rear direction 8. A latching bump 121 which is provided to the contact members 60 and 70 is fitted into the latching hole 92B. Further details will be described later.

<Recording Section 45>

As depicted in FIG. 2, the recording section 45 includes a carriage 48 and a recording head 46 which is mounted on the carriage 48. The carriage 48 and the recording head 46 are arranged at a distance, at the upper side of the platen 50. A gap G is formed between the recording section 45 and the platen 50.

As depicted in FIG. 4, the carriage 48 is installed between the guide rails 92 and 93, and is supported by the guide rails 92 and 93, to be capable of reciprocating in the left-right direction 9. The carriage 48 is fixed to a belt which is not depicted in the diagram. The belt is provided to the guide rail 93, and is turned by a drive motor which is not depicted in the diagram, thereby making the carriage 48 reciprocate in the left-right direction 9.

Figure 3:
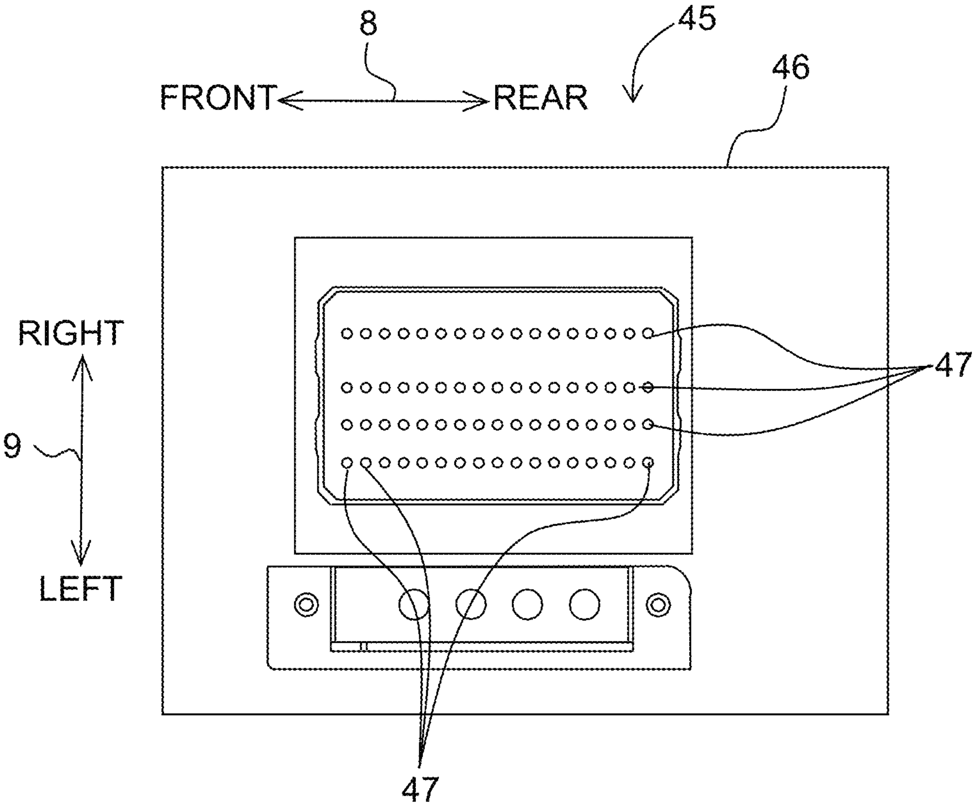
FIG. 3 is a bottom view of a recording head 46.

As depicted in FIG. 2, the recording head 46 is mounted on the carriage 48, and is positioned at the upper side of the platen 50. As depicted in FIG. 3, the recording head 46 has a plurality of nozzles 47 which jets ink droplets in a lower surface thereof. The recording head 46 records an image on the sheet 6 by jetting ink droplets from the nozzles 47 onto the sheet 6 on the platen 50.

<Pair of Transporting Rollers 34>

As depicted in FIG. 2, the transporting rollers 34 are arranged at an upstream side in a transporting direction 19 of the platen 50 (rear side in the front-rear direction 8). Further, a nipping position of the transporting rollers 34 are arranged near the platen 50 at a lower side of the guide rail 92 depicted in FIG. 4. The pair of transporting rollers 34 includes a transporting roller 35, and a driven roller 36 which is arranged at a lower side of the transporting roller 35.

The transporting roller 35 is provided on a rotating shaft 35A which is extended in the left-right direction 9 (direction orthogonal to the paper surface in FIG. 2), and rotates integrally with the rotating shaft 35A. Two end portions of the rotating shaft 35A in the left-right direction are rotatably supported by a frame which is not depicted in the diagram. The driven roller 36 is rotatably supported by a holder which is not depicted in the diagram. The holder is subjected to an upward bias applied by an elastic member which is not depicted in the diagram. The driven roller 36 makes a pressed contact with the transporting roller 35 arranged at the upper side, due to the elastic member. As the rotating shaft 35A is rotated by a drive motor which is not depicted in the diagram, the pair of transporting rollers 34 nips the sheet 6, and transports the sheet 6 in the transporting direction 19.

<Pair of Paper Discharging Rollers 37>

As depicted in FIG. 2, the pair of paper discharging rollers is arranged at a downstream side in the transporting direction 19 of the platen 50 (front side in the front-rear direction 8), and at a lower side of the guide rail 93. The pair of paper discharging rollers 37 includes a plurality of paper discharging rollers 38 and a plurality of spurs 39 arranged at an upper side of the paper discharging rollers 38.

The paper discharging rollers 38 are provided to a rotating shaft 38 which is extended in the left-right direction 9 (direction orthogonal to the paper surface in FIG. 2), and rotates integrally with the rotating shaft 38A. Two end portions of the rotating shaft 38A in the left-right direction 9 are rotatably supported by a frame which is not depicted in the diagram. The spur 39 is rotatably supported by an elastic shaft which is not depicted in the diagram. Two end portions in an axial direction of the elastic shaft are supported by a holding member which is not depicted in the diagram, which is held by the guide rail 93. The spur 39 makes a pressed contact with the paper discharging roller 38 due to the elastic shaft which is bent. As the rotating shaft 38A is rotated by a drive motor which is not depicted in the diagram, the pair of paper discharging rollers 37 nips the sheet 6, and discharges to the paper discharging tray 29.

<Contact Member 60>

The contact members 60 and 70 depicted in FIG. 2 are members which suppress the transported sheet 6 from lifting-off from the platen 50 by warping or curling. As depicted in FIG. 4, the plurality of contact members 60 is arranged to be mutually isolated in the left-right direction 9. Moreover, the plurality of contact members 60 is arranged at positions which are bilaterally symmetrical with a center of the platen 50 in the left-right direction as a base of symmetry. Such an arrangement is made for pressing the sheet 6 of various sizes which is positioned by centering, at a bilaterally symmetrical position. The contact member 60 will be described below while referring to FIGS. 5A to 5F, FIGS. 6A, 6B, and FIGS. 8A to 8D. The up-down direction 7, the front-rear direction 8, and the left-right direction 9 depicted in FIGS. 5A to 5F, FIGS. 6A, 6B, and FIGS. 8A to 8D are direction defined in a state of the contact member 60 fixed to the guide rail 92.

As depicted in FIGS. 5A to 5F, the contact member 60 includes a fitting portion 61 which is to be fitted to the guide rail 92, a contact portion 63 which holds or presses the sheet 6, and a curved portion 62 which connects the fitting portion 61 and the contact portion 63. The contact member 60 is molded by a resin material which has an elastic property so that the contact portion 63 and an elastic portion 120 which will be described later are elastically deformable. Elastic deformation of the contact portion 63 and the elastic portion 120 will be described later.

The fitting portion 61 takes on an outer shape of a plate with a thickness of the plate in the up-down direction 7. A plurality of stiffening ribs 64 for reinforcing, and four protruding inserts 65 which are to be inserted into the insertion holes 97 (FIG. 8A) of the guide rail 92 protrude upward from an upper surface of the fitting portion 61. The four protruding inserts 65 are arranged at two positions side-by-side in the front-rear direction 8 and two positions side-by-side in the left-right direction 9. The four protruding inserts 65 are provided for supporting the fitting portion 61 assuredly by four-point support.

A pair of front and rear claws 66 and 67 which are hitched on an upper surface of the guide rail 92 (FIG. 8D) is provided to a front-end portion (upper-end portion) of a protrusion of the protruding insert 65. The claw 66 is protruded frontward in the front-rear direction 8, from an upper-end portion of the protruding insert 65. The claw 67 is protruded rearward in the front-rear direction 8, from the upper-end portion of the protruding insert 65.

The elastic portion 120 in the form of a plate which is flexible in the up-down direction, is extended rearward from a rear end of the fitting portion 61 in the front-rear direction. A latching bump 121 which fits into the latching hole 92B described above, which is provided to the guide rail 92 is protruded upward from an upper surface of a front-end portion (rear-end portion in the front-rear direction 8) of a protrusion of the elastic portion 120.

For fixing the contact member 60 on the guide rail 92, firstly, as depicted in FIG. 8B, the protruding insert 65 is inserted into the first hole 98 of the insertion hole 97, from a lower side of the guide rail 92. Next, the contact member 60 is moved leftward in the left-right direction 9. As the contact member 60 is moved leftward, the latching bump 121 makes a contact with a lower surface of the guide rail 92, and the elastic portion 120 is bent. As depicted in FIG. 8C and FIG. 8D, as the contact member 60 is moved further leftward and the protruding insert 65 is fitted into the second hole 99, due to an elastic force of the elastic portion 120, the latching bump 121 is fitted into the latching hole 92B. Accordingly, the contact member 60 is latched in the front-rear direction 8 and the left-right direction 9, and is slightly movable in the vertical direction 7. Concretely, the contact member 60 supported by the guide rail 92 to be movable in the vertical direction, between a lower limit position at which the claws 66 and 67 make a contact with the upper surface of the guide rail 92, and an upper limit position at which an upper end of the stiffening rib 64 makes a contact with the lower surface of the guide rail 92. The fitting portion 61 is fitted to the guide rail 92 so that, the contact portion 63 which will be described later does not make a contact with an upper surface of the platen 50, at the lower limit position. Further, the fitting portion 61 is fitted to the guide rail 92 so that the contact portion 63 is at a position above an upper end of the supporting rib 51 and below the lower surface of the recording section 50, at the upper limit position depicted in FIG. 6A. The reason for fixing the contact member 60 on the guide rail 92 in such manner is that, it reduces the number of components, as screws etc. are not to be used for fixing, thereby making the fixing job easy, and positioning in height position (upper limit position) of the contact portion 63 can be accurate, since the guide rail 92 can be used as a basis (a reference).

The contact member 60 is at the lower limit position due to a weight of the contact member 60, when no external force is exerted. As the transported sheet 6 makes a contact with the contact portion 63 which will be described later, the contact member 60 moves from the lower limit position to the upper limit position. The details will be described later.

Figure 5A:
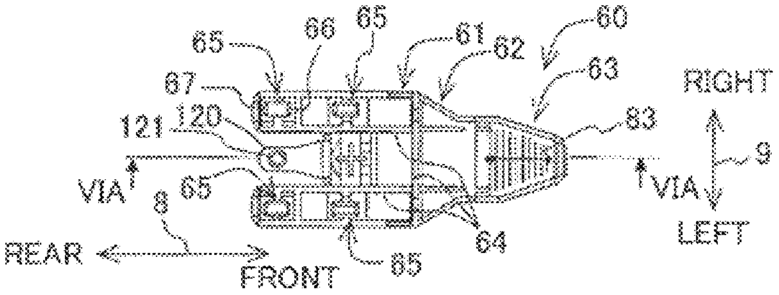
FIG. 5A, FIG. 5B, FIG. 5C, FIG. 5D, FIG. 5E, and FIG. 5F are diagrams showing a contact member 60, where.
Figure 5B:
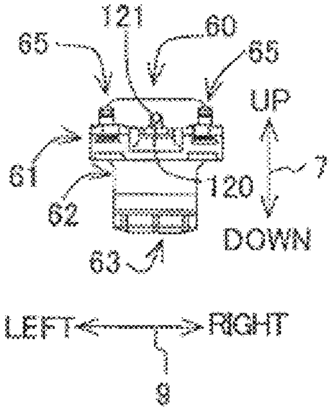
Figure 5C:
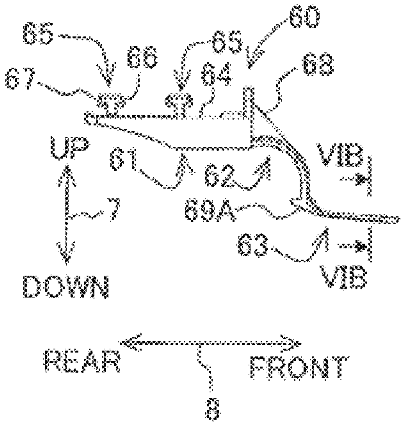
Figure 5D:
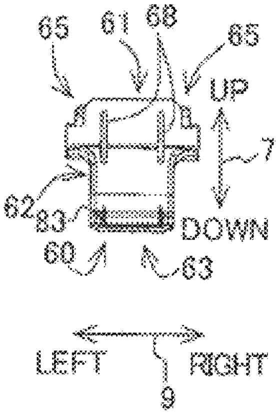
Figure 5E:
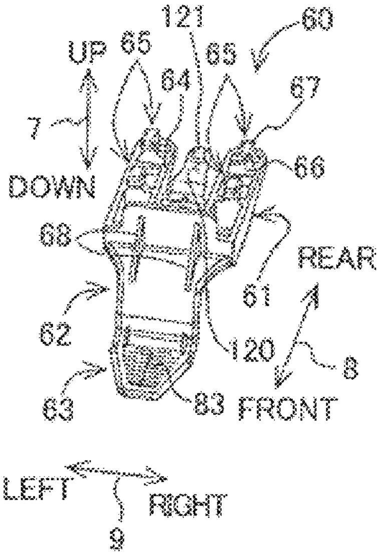
Figure 5F:
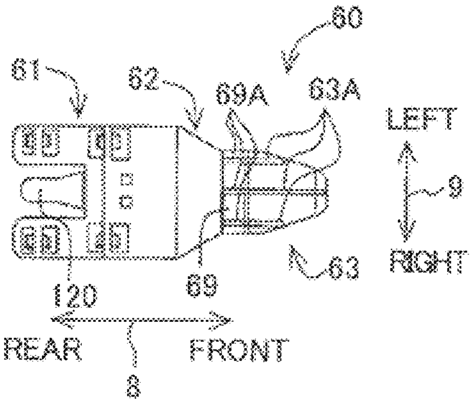

As depicted in FIG. 5C, the curved portion 62 is extended downward while bending in a circular arc shape. This is for avoiding a contact between the curved portion 62 and the transporting roller 35 (FIG. 4) arranged at the lower side of the guide rail 92 (FIG. 4). The curved portion 62 is reinforced by the stiffening rib 68 for suppressing the bending.

At a lower end of the curved portion 62, a guide surface 69 which guides a downstream end of the transported sheet 6 in the transporting direction 19 to the contact portion 63, is provided. In the following description, the downstream end of the transported sheet 6 in the transporting direction 19 is called merely a front end of the sheet 6. To describe more elaborately, the guide surface 69 is formed to be an inclined surface which is extended to be inclined downward in the frontward direction from a position inclined upward in the frontward direction of a nipping position of the pair of transporting rollers 34 (FIG. 2). From the guide surface 69, three guide ribs 69A which are extended in a direction in which the guide surface 69 is extended (to be inclined downward in the frontward direction), are protruded. The guide ribs 69A are provided one each at two end portions and a central portion of the guide surface 69 in the left-right direction. The front end of the sheet 6 which is transported by the pair of transporting rollers 34 makes a contact with a front end (lower end) of the protrusion of the guide rib 69A, and is guided to the contact portion 63.

As depicted in FIGS. 5A to 5F, the contact portion 63 is in the form of a plate which is extended to be inclined downward in the frontward direction from a front surface in the front-rear direction 8 of a lower-end portion of the curved portion 62, and is inclined slightly with respect to a horizontal surface (horizontal plane) to come closer to the upper surface of the platen (50) as directed frontward. A front end of the contact portion 63 in the front-rear direction 8 is positioned at a rear side (upstream-end side in the transporting direction) of the nozzle 47 of the recording head 46 in the front-rear direction 8, and at a front side (a downstream side of the upstream side in the transporting direction) of a rear end of the carriage 48 in the front-rear direction, and is close to the nozzles 47. The plurality of contact members 60 is installed on the guide rail 92 such that the contact portions 63 assume same positions in the up-down direction 7 and the front-rear direction 8.

The reason why the contact portion 63 is inclined is for guiding smoothly the transported sheet 6 (FIG. 2), to the front end of the contact portion 63 in the front-rear direction 8. Moreover, the reason why the contact portion 63 is in the form of a plate is, for arranging the contact portion 63 in the gap G (FIG. 2) of which a distance in the up-down direction is shortened, and for securing a strength of the contact portion 63. The reason why the front end of the contact portion 63 in the front-rear direction 8 is brought closer to the nozzle 47 (FIG. 3) is, for improving the accuracy of image recording by pressing (holding) the sheet 6 at a position near the nozzle 47.

The contact portion 63 is formed to have a tapered shape which is inclined such that two ends in the left-right direction come closer, toward the front (as directed frontward) in the front-rear direction 8, in order to bend easily in the vertical direction. Since a front-end portion of the contact portion 63 in the front-rear direction 8 is formed to have tapered shape, the front-end portion of the contact portion 63 is bent when slightly thick sheet 6 is transported, and the thick sheet 6 is prevented from blocking or jamming between the contact portion 63 and the platen 50 (FIG. 2).

From a second surface 82 which is a lower surface of the contact portion 63, three contact ribs 63A which are extended in a direction in which the contact portion 63 is extended to be inclined (downward in the frontward direction), are protruded downward. The contact ribs 63A are provided one each at two end portions and a central portion of the left-right direction 9, and are connected or joined to the guide ribs 69A of the curved portion 62. The contact rib 63A makes a contact with an upper surface of the transported sheet 6, and presses the sheet 6 from an upper-surface side. Since the contact rib 63A is provided, an area of contact between the contact member 60 and the sheet 6 decreases, and a transporting resistance of (for) the sheet 6 is reduced. As a result, the accuracy of image recording is improved.

As depicted in FIG. 6, a surrounding rib 84 (an example of a surrounding rib of the present teaching) is protruded upward from a peripheral edge of a first surface 81 which is an upper surface of the contact portion 63. The surrounding rib 84 is provided to be connected to two end portions of the first surface 81 in the left-right direction 9 and a front-end portion of the first surface 81 in the front-rear direction 8. The surrounding rib 84, demarcates (divides) a storage section (storage portion) 86 which stores ink, together with the first surface 81.

A protruding rib 83 (an example of a protruding portion of the present teaching) is extended in a direction in which the contact portion 63 is inclined (inclined downward in the frontward direction), from a central portion of the first surface 81 in the left-right direction 9. An amount of protrusion L1 of the protruding rib 83 from the first surface 81 is larger than an amount of protrusion L2 of the surrounding rib 84 from the first surface 81. Accordingly, when at least one of the recording section 45 and the contact portion 63 is displaced in a direction of the recording section 45 and the contact portion 63 coming closer, the contact portion 63 makes a contact with the recording section 45 at the protruding rib 83. At this time, when an ink due to ink mist etc. is adhered to the lower surface of the recording section 45, the ink is adhered to an upper end of the protruding rib 83. The ink adhered to the protruding rib 83 flows to the first surface 81 by running down a surface of the protruding rib 83 due to gravitation force. In order that the ink adhered to the protruding rib 83 does not flow to an upper end of the surrounding rib 84, the protruding rib 83 is provided at an inner side of the surrounding rib 84, and is isolated from the surrounding rib 84.

A plurality of ribs 85 is provided to the first surface 81 so that the ink which has flowed to the first surface 81 does not accumulate near the protruding rib 83. This will be described in detail. A plurality of ribs 85 is provided on both sides of the protruding rib 83 in the left-right direction. The ribs 85 are extended in the left-right direction, and are provided to be mutually isolated in the front-rear direction 8. One of the ends in the left-right direction 9 of the rib 85 is extended up to the protruding rib 83, and the other end is isolated from the surrounding rib 84. An amount of protrusion L3 from the first surface 81 of the rib 85 is smaller than the amount of protrusion L1 of the protruding rib 83 so that the rib 85 does not make a contact with the recording section 45. A second groove 102 is formed by two adjacent ribs 85. Ink which has adhered to the protruding rib 83, upon flowing to the second groove 102 by running down the protruding rib 83, is spread or diffused inside the second groove 102 due to capillarity, and flows to a first groove 101 which is formed by the rib 85 and the surrounding rib 84. Accordingly, the ink adhered to the protruding rib 83 is ceased from accumulating near the protruding rib 83. As the ink ceases to accumulate near the protruding rib 83, it is possible to suppress the ink from moving to the recording section 45 from the protruding rib 83 when the protruding rib 83 and the recording section 45 have made a contact once again.

<Contact Member 70>

As depicted in FIG. 4, the contact members 70 are arranged at an upper side of two end portions of the platen 50 in the left-right direction. Therefore, a shape of the contact member 70 is changed slightly from a shape of the contact member 60. The contact member 70 will be described below in detail with reference to FIGS. 7A to 7F. In FIGS. 7A to 7F, the up-down direction 7, the front-rear direction 8, and the left-right direction 9 are indicated as directions in a state of the contact member 70 fixed to the guide rail 92.

The contact member 70 includes a fitting portion 71, a curved portion 72, and a contact portion 73. The fitting portion 71, similarly as the fitting portion 61 of the contact member 60, is provided with a stiffening rib 74 for reinforcing, a protruding insert 75, and an elastic portion 120, and the latching bump 121. The fitting portion 71 has almost a same structure as the fitting portion 61 of the contact member 60 except for a point that, a claw 77 is not provided to two protruding inserts 75 at a front side in the front-rear direction 8. The reason why the two protruding inserts 75 are not provided with the claw 77 is, for avoiding an interference of two members. The fitting portion 71, similarly as the fitting portion 61 of the contact member 60, is fixed to the guide rail 92 by the four protruding inserts 75, the claws 76 and 77, and the stiffening rib 74.

The curved portion 72 has a stiffening rib 78 for reinforcing, a guide surface 79, and a guide rib 79A, and is formed to have almost similar shape as the curved portion 62 of the contact member 60.

The contact portion 73 has a rectangular shape which is slightly inclined with respect to a horizontal plane such that a front end thereof in the front-rear direction 8 is positioned at a lower side than the rear end. The front end (lower end) of the contact portion 73 in the front-rear direction 8 is positioned at the same position in the up-down direction 7 and the front-rear direction 8, as the front end (lower end) of the contact portion 63 in the front-rear direction 8.

Similarly, as in the contact member 60, the protruding rib 83, the surrounding rib 84, and the rib 85 are provided on a side of the first surface 81 which is an upper surface of the contact portion 73. Moreover, from the second surface 82 which is the lower surface of the contact portion 73, three contact ribs which are extended in a direction in which the contact portion 73 is extended to be inclined (downward in the frontward direction) are protruded downward. The contact ribs 73A are provided one each at two end portions and a central portion of the contact portion 73 in the left-right direction, and are connected to the guide rib 79A of the curved portion 72. The contact rib 73A makes a contact with the upper surface of the transported sheet 6, and presses the sheet 6.

The contact member 70 is arranged such that, a left end in the left-right direction 9 or the right end in the left-right direction 9 of the sheet 6 (such as A4 size or legal size) is between the two contact ribs 73A. Accordingly, sometimes, the sheet 6 does not make a contact except with one of the contact ribs 73A in the left-right direction 9. When the contact portion 73 is presumed to have a tapered shape as the contact portion 63, it becomes impossible to press the sheet 6 up to a vicinity of the nozzles 47 (FIG. 3). Therefore, the contact portion 73 does not have a tapered shape, and is rectangular-shaped. The contact member 70, presses the sheet 6 up to the vicinity of the nozzles 47 at an inner side of the two ends of the sheet 6 in the left-right direction by the contact rib 73A. A notch 73B which is cut out from a front end is provided to a central portion in the left-right direction 9 of a front-end portion of the contact portion 73 in the front-rear direction 8. Due to the notch 73B, a front end in the front-rear direction 8 of the abutting rib 73A provided at the central portion of the contact portion 73 in the left-right direction is positioned at a rear side of a front end of the contact rib 73A on the left side and the right side.

<Operation of Embodiment>

An operation of the ink-jet recording apparatus 10 will be described with reference to FIG. 2. The sheet 6 placed on the main tray 21 is fed to the transporting path 31 by the feeding roller 43. The sheet 6 which is fed is transported by the pair of transporting rollers 34. The front end of the sheet 6 which has passed the nipping position of the pair of transporting rollers 34 is guided to the contact portions 63 and 73 by the guide ribs 69A and 79A of the contact members 60 and 70. The sheet 6 which has been guided lifts up the contact members 60 and 70 which are at the lower limit position, to the upper limit position. The contact members 60 and 70 which have been moved to the upper limit position press the sheet 6 from the upper side by the contact ribs 63A and 73A of the contact portions 63 and 73, and suppress the lifting-off of the sheet 6 from the platen 50. As the front-end portion of the sheet 6 reaches a position at a lower side of the nozzle 47 of the recording head 46 (FIG. 3), the rotating of the transporting roller 35 stops. Thereafter, ink droplets are jetted from the nozzle 47 on to the sheet 6 while the carriage 48 reciprocates in the left-right direction, and printing of one line is carried out. After printing of one line is carried out, the transporting roller 35 is rotated and the sheet 6 is forwarded by a portion equivalent to one line. Printing of one line and transporting (forwarding) of sheet 6 equivalent to the portion of one line are repeated alternately, and an image is recorded on the sheet 6. The sheet 6, after having the image recorded thereon, is discharged to the paper discharging tray 29 by the pair of paper discharging rollers 37. Moreover, as the sheet 6 passes the contact members 60 and 70, the contact members 60 and 70 which were at the upper limit position return to the lower limit position due to its weight.

Figure 6A:
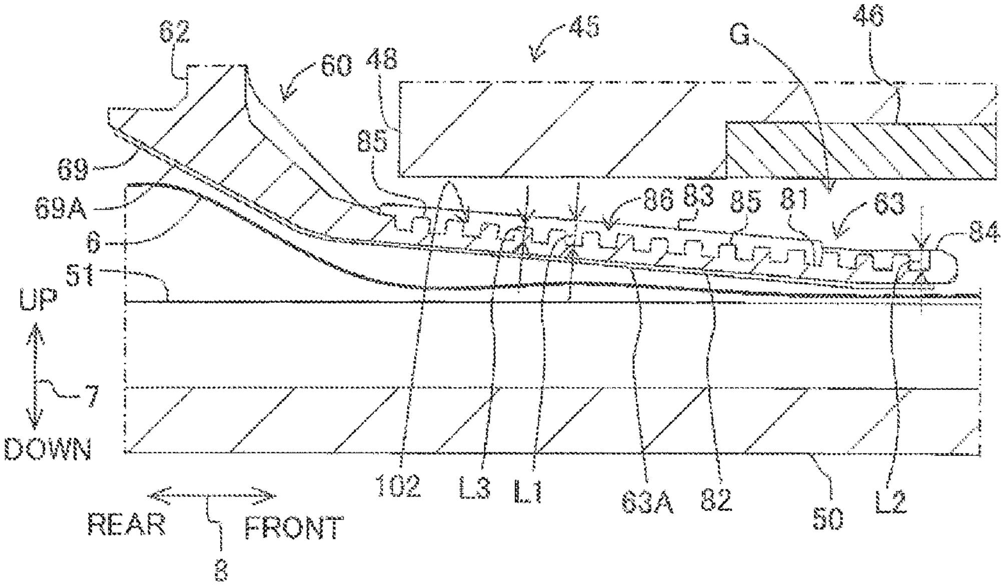
FIG. 6A is partially enlarged view of a cross-section taken along a line VIA-VIA in FIG. 5A.
Figure 6B:
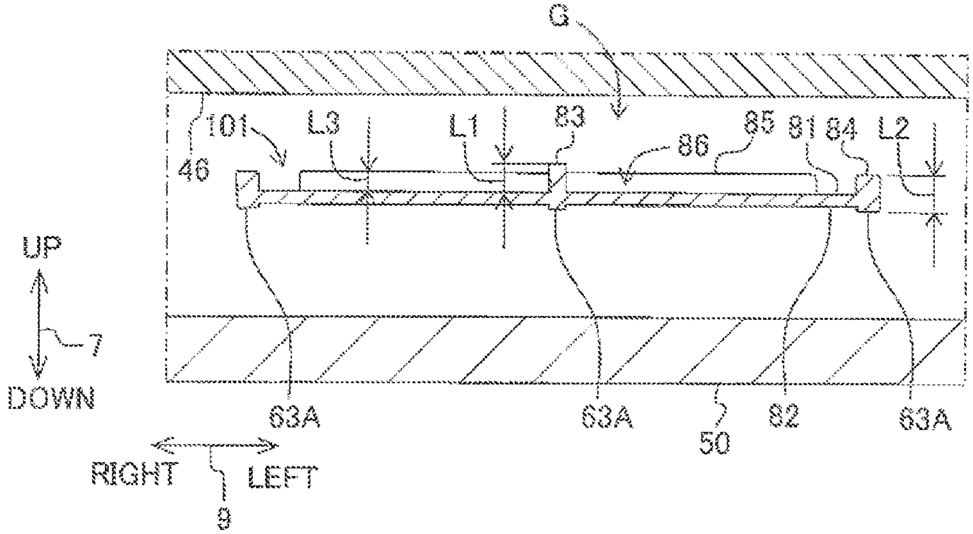
FIG. 6B is a partially enlarged view of a cross-section taken along a line VIB-VIB in FIG. 5C.
Figure 7A:
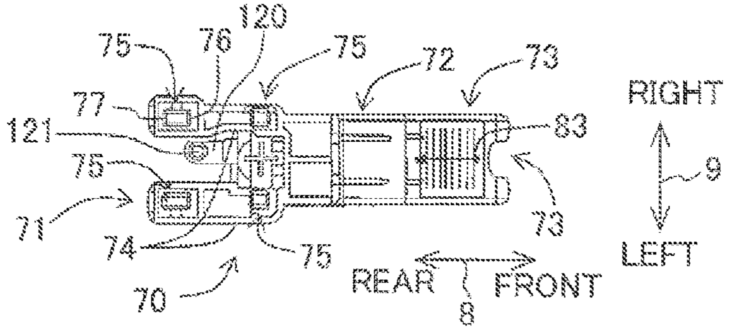
FIG. 7A, FIG. 7B, FIG. 7C, FIG. 7D, FIG. 7E, and FIG. 7F are diagrams showing a contact member 70, where.
Figure 7B:
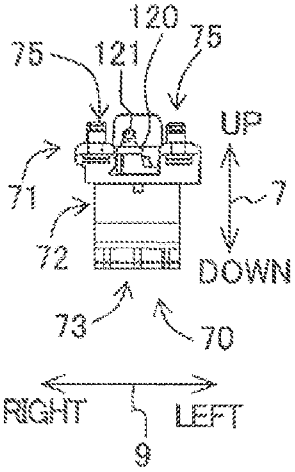
Figure 7C:
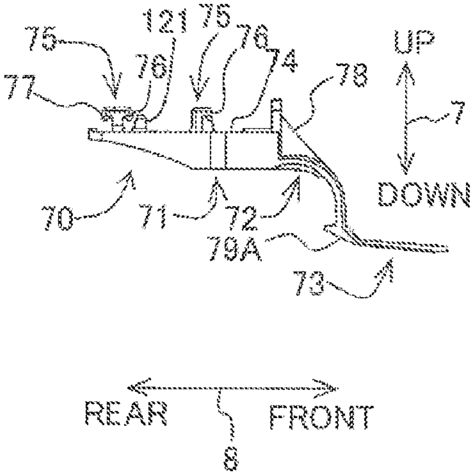
Figure 7D:
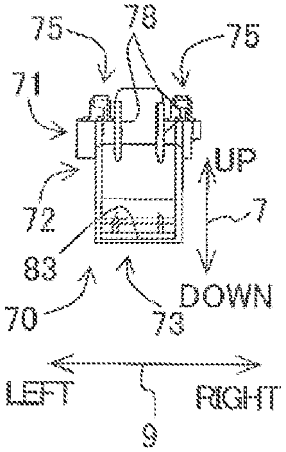
Figure 7E:
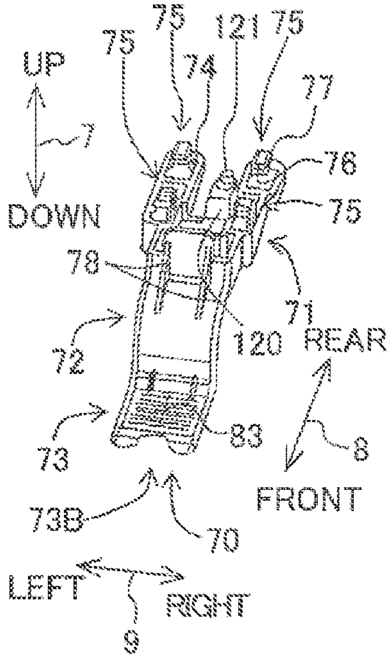
Figure 7F:
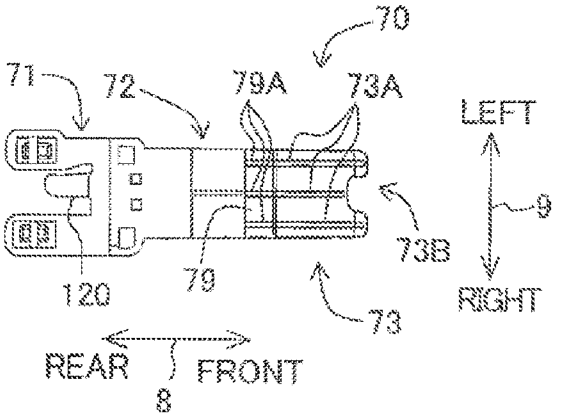

As the recording section 45 is displaced to the lower side, or as the recording section 45 is displaced to an upper side due to bending of the contact portions 63 and 73, the contact portions 63 and 73 make contact with the recording section 45 at the protruding rib 83 (FIGS. 6A, 6B). The ink which has adhered to the protruding rib 83 due to contacting with the recording section 45 flows to the second groove 102 (FIGS. 6A, 6B) running down the protruding rib 83. The ink which has flowed to the second groove 102 flows into the second groove 102 due to capillarity, and flows to the first groove 101. The ink is stored in the first groove 101 and the second groove 102 (storage section 86).

<Effect of Embodiment>

In the embodiment, the storage section 86 which stores ink is provided on the side of the first surface 81 of the contact portion 63, and the protruding rib 83 which makes a contact with the recording section 45 is provided at the inner side of the surrounding rib 84 which demarcates the storage section 86. Therefore, the ink which has adhered to the protruding rib 83 due to contacting with the recording section 45 flows to the storage section 86 running down the protruding rib 83, and is stored in the storage section 86. By being stored in the storage section 86, the ink is suppressed from flowing toward the second surface 82. As a result, it is possible to suppress the sheet 6 from becoming dirty or stained by the ink which has adhered to the contact members 60 and 70. Accordingly, it is possible to improve the accuracy of image recording by shortening the distance of the gap Gin the up-down direction.

Moreover, since the plurality of ribs 85 is provided to the first surface 81, it is possible to suppress the ink from being accumulated densely near the protruding rib 83. As a result, it is possible to suppress the ink from moving from the protruding rib 83 to the recording section 45 when the protruding rib 83 and the recording section 45 have abutted once again.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

First Modified Embodiment

Figure 9A:
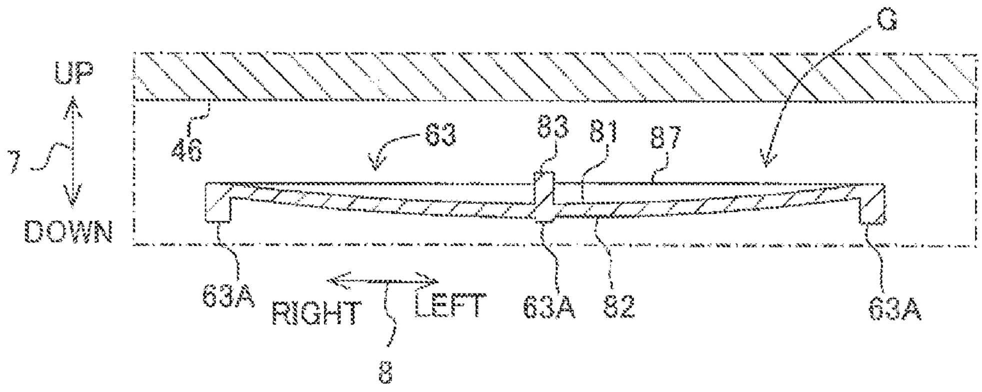
FIG. 9A is a cross-sectional view orthogonal to a frontward-rearward direction 8, of a contact portion 63 in a first modified embodiment.

In the abovementioned embodiment, an example in which the first surface was formed to be a flat surface has been described. In a first modified embodiment, an example in which the first surface 81 is formed to be a curved surface as depicted in FIG. 9A will be described. The first surface 81 and the second surface 82 are formed to be circular arc shaped curved surfaces of which a central portion in the left-right direction is positioned at a lower side of a left end and a right end. From the second surface 82, three contact ribs 63 are protruded downward similarly as in the embodiment.

From the front-end portion of the first surface 81 in the front-rear direction 8, a rib which is not depicted in the diagram is protruded upward. This rib is extended up to two ends of the first surface 81 in the left-right direction 9. The storage section 86 is demarcated by this rib and the first surface 81. The protruding rib 83 is provided to be extended in a direction in which the contact portion 63 is inclined (downward in the frontward direction).

In the first modified embodiment, similarly as in the abovementioned embodiment, it is possible to store the ink adhered to the protruding rib 83 due to abutting with the recording section 45, in the storage section 86, and to suppress the ink from flowing to the second surface 82.

Second Modified Embodiment

Figure 9B:
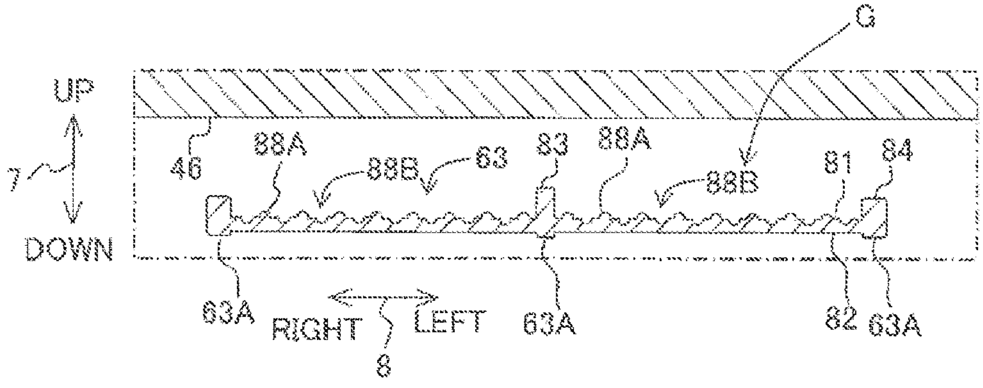
FIG. 9B is a cross-sectional view orthogonal to the frontward-rearward direction 8, of the contact member 63 in a second modified embodiment.

In a second modified embodiment, an example in which a plurality of recesses 88B and a plurality of bumps 88A having a hemispherical shape depicted in FIG. 9B, instead of the plurality of ribs 85 in the embodiment and the first modified embodiment, are provided to the first surface 81, will be described. The plurality of bumps 88A is protruding upward from the first surface 81. The recesses 88B are dented in the first surface 81. The plurality of bumps 88A and the plurality of recesses 88B are provided on the entire first surface 81. Due to the bumps 88A and the recesses 88B, an area of contact between the contact portion 63 and the ink flowed to the first surface 81 becomes large. As a result, even in a case in which vibrations are imparted to the contact portion 63, it is possible to hold the ink assuredly. When the area of contact can be made large, the bumps 88A and the recesses 88B may be formed to have an arbitrary shape. For instance, the bumps 88A and the recesses 88B may be formed to have various shapes such as a semielliptical shape and a rectangular column shape, apart from the hemispherical shape.

In the second modified embodiment, the example in which the plurality of bumps 88A and the plurality of recesses 88B are provided has been described. However, the first surface 81 may be provided with only the bumps 88*a* or only the recesses 88B.

Third Modified Embodiment

Figure 9C:
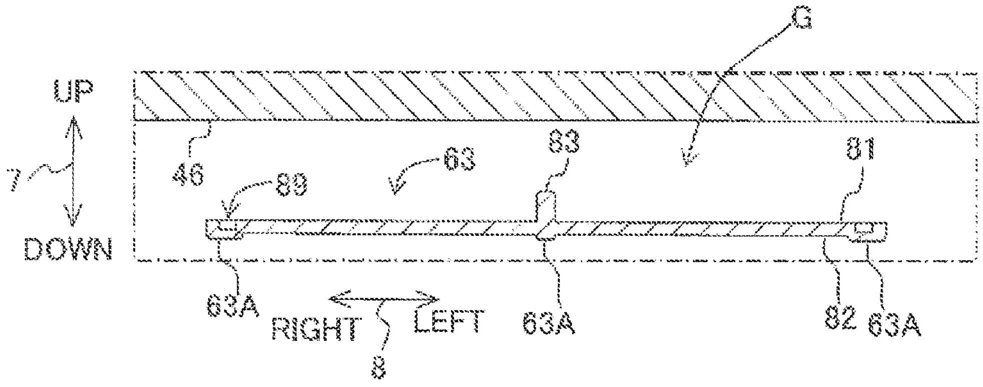
FIG. 9C is a cross-sectional view orthogonal to the frontward-rearward direction 8, of the contact member 63 in a third modified embodiment.

In a third modified embodiment, an example in which instead of the surrounding rib 84, a first groove 89 depicted in FIG. 9C is provided to a peripheral edge portion of the first surface 81, will be described. The first groove 89 is provided to be dented from the first surface 81, at two end portions of the first surface 81 in the left-right direction, and a front-end portion of the first surface 81 in the front-rear direction. The storage section 86 is demarcated by the first groove 89. The protruding rib 83 is provided similarly as in the abovementioned embodiment.

The ink which has flowed from the protruding rib 83 to the first surface 81, upon flowing on the first surface 81, flows to the first groove 89, and spreads inside the first groove 89 due to capillarity.

Even in the third modified embodiment, similarly as in the abovementioned embodiment, it is possible to store the ink adhered to the protruding rib 83 due to contacting with the recording section 45, in the storage section 86 (first groove 89), and to suppress the ink from flowing toward the second surface 82.

In the third modified embodiment, the plurality of bumps 88A and the plurality of recesses 88B described in the second modified embodiment may be provided to the first surface 81 which is at the inner side of the first groove 89.

Fourth Modified Embodiment

In the embodiment described above, an example in which the lower end of the contact portions 63 and 73 at the upper limit position is positioned at the upper side of the upper end of the supporting rib 51, has been described. In a fourth modified embodiment, an example in which the lower end of the contact portions 63 and 73 at the upper limit position is positioned at a lower side of the upper end of the supporting rib 51, and the sheet 6 which is susceptible to bending such as a regular paper (standard paper) is transported in the form of a wave (forming a wave-shape) by the contact portions 63 and 73, and the supporting rib 5,1 will be described.

Figure 10A:
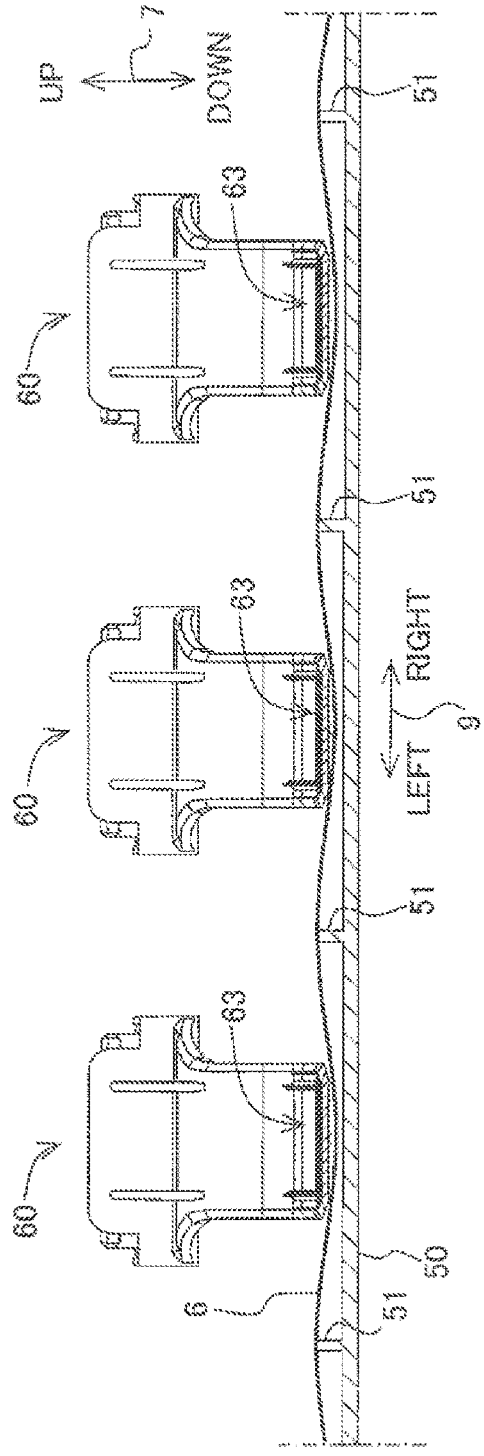
FIG. 10A is a cross-sectional view orthogonal to the frontward-rearward direction 8, of a platen 50 of a fourth modified embodiment.

As depicted in FIG. 10A, the platen 50 and the supporting rib 51 are provided at positions which are intermediate between the two adjacent contact members 60 in the left-right direction 9. Because of such an arrangement, it is possible to let a distance between an upper peak of the wave and a lower peak of the wave to be same, and thereby the control of the recording head 46 becomes easy. In the recording head 46, an accuracy of image recording is improved by jetting the ink droplets upon taking into consideration a distance between the sheet 6 and the nozzles 47 (FIG. 3) which changes periodically due to the wave-shape. Therefore, making the distance between the upper peak of the wave and the lower peak of the wave to be same, control of the recording head 46 becomes easy.

For making the transported sheet 6 to have the shape of a wave, the supporting rib 51 of the platen 50 is provided such that, the front end (upper end) of the protrusion is positioned at an upper side of the lower end (front end in the front-rear direction 8) of the contact ribs 63A and 73A at the upper limit position. The sheet 6 which is transported, while passing the contact portions 63 and 73, is supported by the supporting rib 51, and is pushed down by the contact ribs 63A and 73A. The sheet 6 is made to be wave-shaped with a portion supported by the supporting rib 51 let to be the 'upper peak' of the wave-shape and a portion pushed down by the contact ribs 63A and 73A let to be the 'lower peak' of the wave-shape. The sheet 6 which is made to be wave-shaped is suppressed from being warped upward.

Fifth Modified Embodiment

In a fifth modified embodiment, in addition to the arrangement in the fourth modified embodiment, the platen 50 is provided pivotably so that, it is possible to record an image not only on the sheet 6 which is susceptible to bending such as a regular paper, but also on the sheet paper 6 such as a glossy paper and a cardboard. This will be described below in detail. The platen 50 as depicted in FIG. 11 is pivotably (rotatably) supported by the rotating shaft 38 of the paper discharging roller 38 at the front-end portion in the front-rear direction 8. Accordingly, a rear-end portion of the platen 50 in the front-rear direction 8 is displaceable vertically. The platen 50 is turned to a first position in FIG. 10A and a second position in FIG. 10B. Here, the first position is a position at which the upper end of the supporting rib 51 is positioned at an upper side of the lower end (front end in the front-rear direction) of the contact portions 63 and 73 which are at the upper limit position, and the second position is a position at which the upper end of the supporting rib 51 is positioned at a lower side of the lower end of the contact portions 63 and 73 which are at the upper limit position.

As depicted in FIG. 11, a coil spring 113 which applies a bias to the platen 50 toward the first position (upward) is arranged at a lower side of the rear-end portion of the platen 50 in the front-rear direction. A lower end of the coil spring 113 is supported by being contacted with an intermediate plate 112 provided to a frame which is not depicted in the diagram. An upper end of the coil spring 113 makes a contact with a lower surface of the platen 50. The platen 50 is subjected to bias which is applied toward the first position (upward) by the coil spring 113, and makes a contact with a holder 114 which rotatably holds the driven roller 36, and assumes the first position.

Figure 10B:
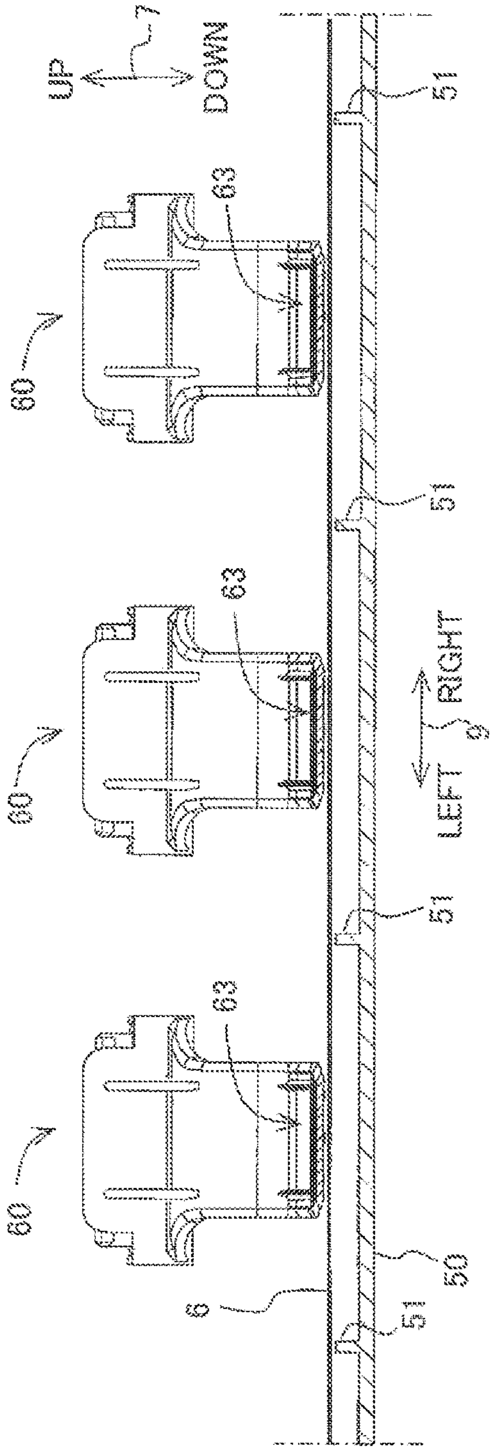
FIG. 10B is a cross-sectional view orthogonal to the frontward-rearward direction, in a state in which the platen 50 of a fifth modified embodiment is at a second position.
Figure 11:
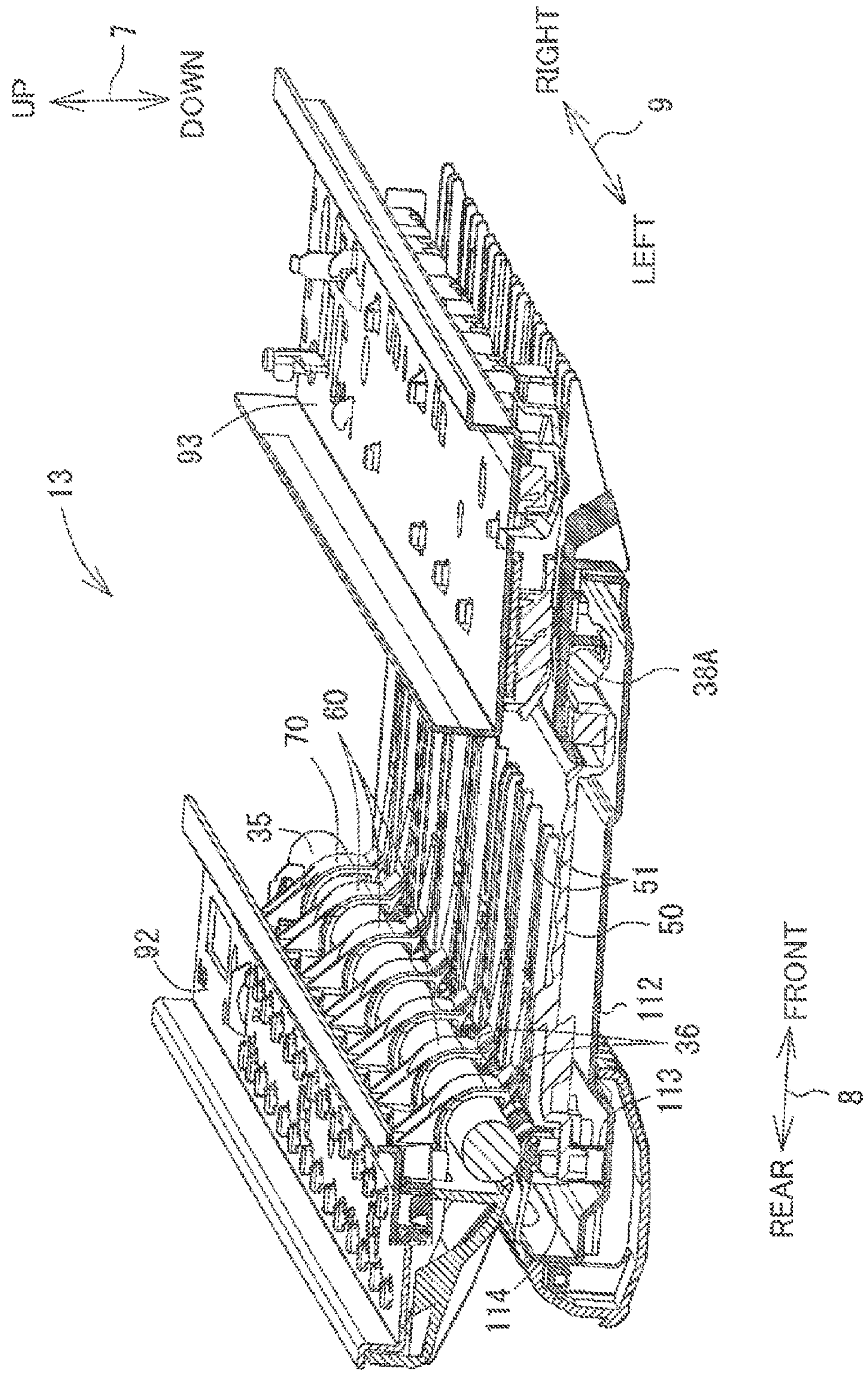
FIG. 11 is a perspective view in which, a part of the main body 13 in the fifth modified embodiment is broken.

As depicted in FIG. 10B, when the sheet 6 which is hard to bend (curl) such as a glossy paper, is transported, the platen 50 is turned from the first position to the second position by the sheet 6. The sheet 6 turns the platen 50 to the second position, and is transported without being made wave-shaped. The platen 50 which is turned to the second position is returned to the first position due to the bias (due to the force imparted) by the coil spring 11 as the sheet 6 passes the contact members 60 and 70.

Figure 12A:
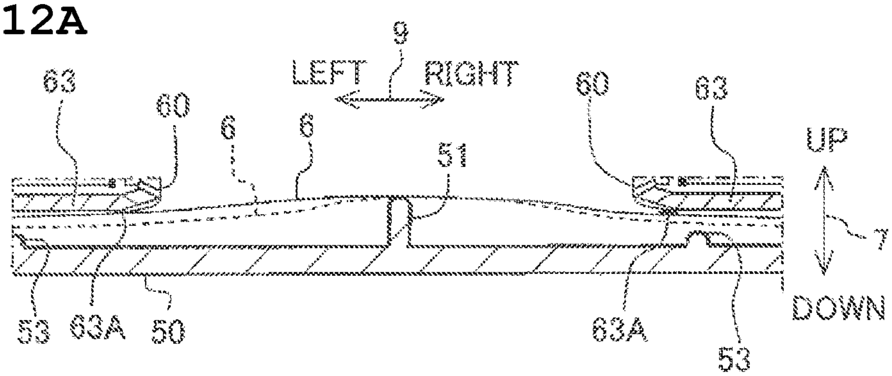
FIG. 12A, FIG. 12B, FIG. 12C, and FIG. 12D are diagrams explaining a movement in the fifth modified embodiment, where.
Figure 12B:
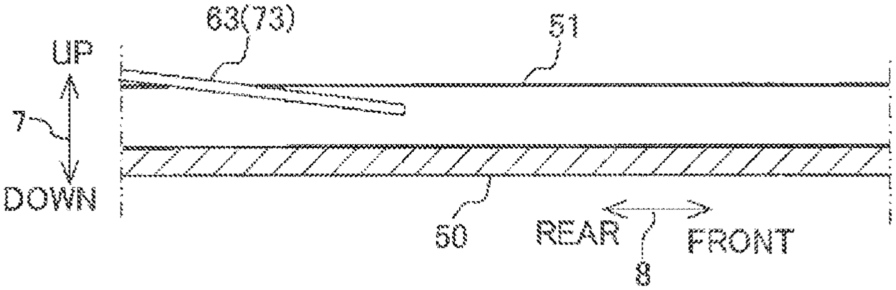
Figure 12C:
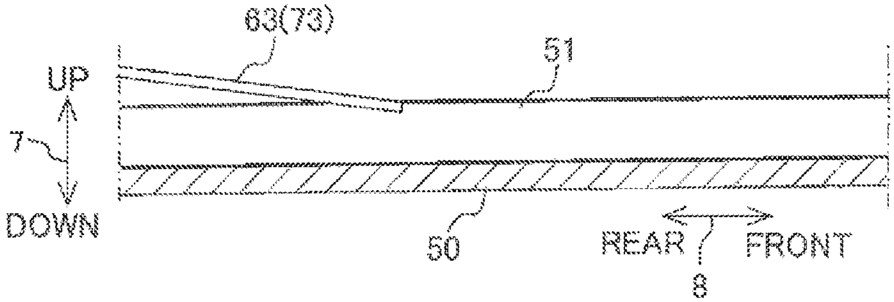
Figure 12D:
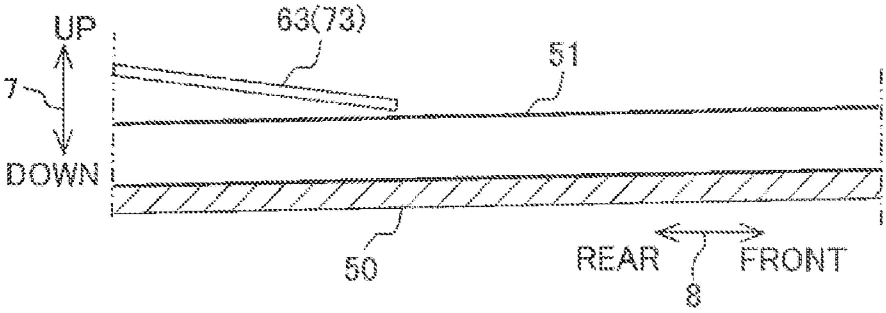

As the sheet 6 such as a cardboard which is thicker than a regular paper is transported, the platen 50 is pivoted or turned from a first position depicted in FIG. 12B to a position depicted in FIG. 12C. The position depicted in FIG. 12C is an intermediate position between the first position depicted in FIG. 12B and a second position depicted in FIG. 12D. As the platen 50 is pivoted to the position in FIG. 12C, the sheet 6, as depicted by a solid line in FIG. 12A, is transported upon assuming a wave-shape which is gentler with smaller amplitude of wave than in a case of the regular paper. The recording section 45 jets ink droplets according to the gentler wave-shape assumed by the sheet 6. Concretely, in the recording head 46, the distance between the sheet 6 and the nozzles 47 (FIG. 3) changes periodically, and the recording head 46 jets ink droplets presuming that an amount of change is smaller as compared to a case of the regular paper. As to whether the sheet 6 is a regular paper, or a glossy paper, or a cardboard, can be judged from information which is included in print instructions. Or, a sensor which detects the thickness of the sheet 6 may be provided.

In the fifth modified embodiment, since the platen 50 is turned according to the thickness of the sheet 6 or susceptibility of the sheet 6 to bending, it is possible to record an image by transporting the sheet 6 without being particular about the thickness of the sheet 6 or susceptibility of the sheet 6 to bending.

In the fifth modified embodiment, an example in which the rear-end portion of the platen 50 in the front-rear direction is displaced vertically due to turning has been described. However, the platen 50 may be provided to be movable entirely in the vertical direction 7 while maintaining a horizontal state.

Sixth Modified Embodiment

In the fifth modified embodiment, an example in which the platen 50 is pivotably provided such that the sheet 6 such as a glossy paper which is hard to bend is transported without being made to be wave-shaped. In a sixth modified embodiment, an example in which the contact members 60 and 70 are provided pivotably instead of the platen 50 being provided pivotably, will be described.

Figure 13A:
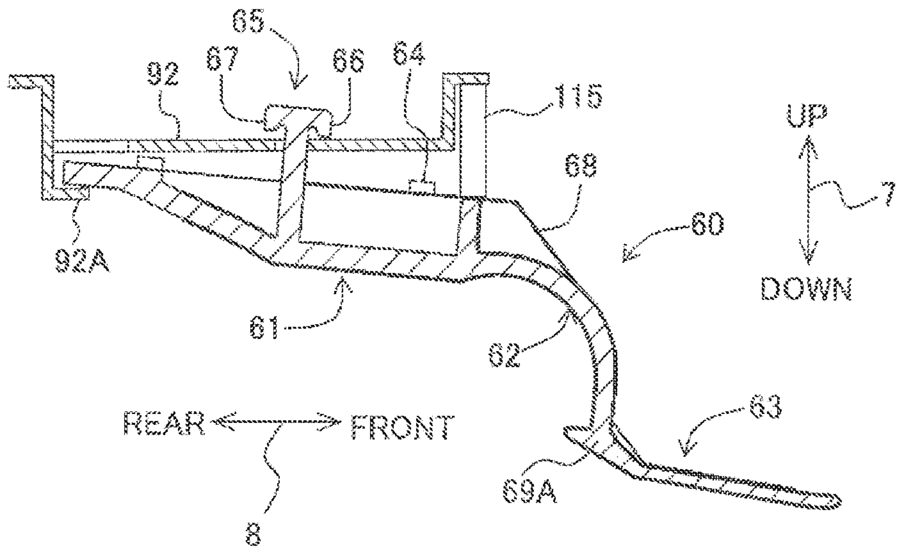
FIG. 13A and FIG. 13B are vertical cross-sectional views of the contact member 60, explaining an operation of a sixth modified embodiment, where.
Figure 13B:
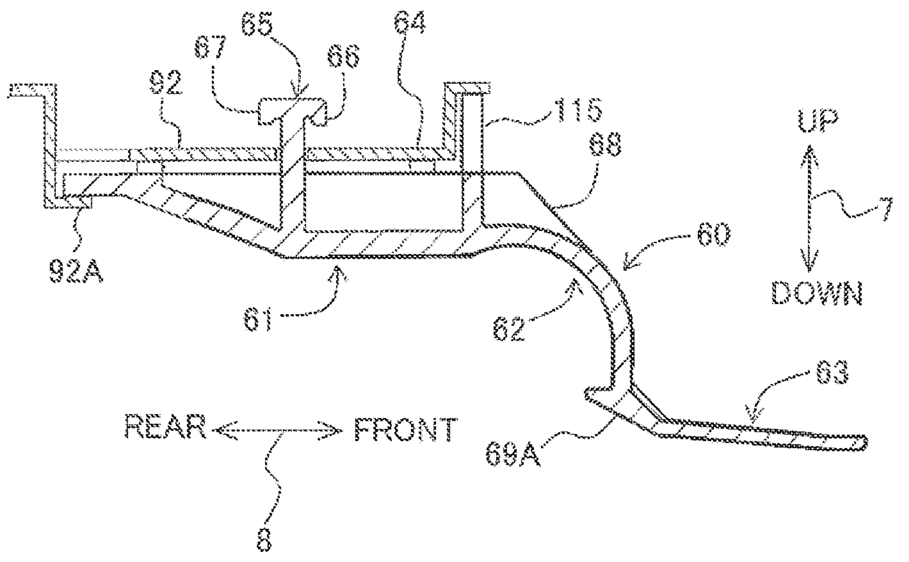

As depicted in FIG. 13, the guide rail 92 is provided with a receiving portion (retaining portion) 92A which pivotably supports the rear-end portion of the contact members 60 and 70 in the front-rear direction. The contact member 60 depicted in FIG. 13 will be described below, and the description for the contact member 70 is similar as the description for the contact member 60.

The contact member 60, unlike in the abovementioned embodiment, is not provided with the protruding insert 65 of the rear side in the front-rear direction 8. Moreover, a length in the vertical direction 7 of the protruding insert 65 in the front-rear direction is longer than a length of the protruding insert 65 in the abovementioned embodiment (FIGS. 5A to 5F). The contact member 60 is pivoted with the rear-end portion as an axis to a third position (FIG. 13A) at which the claw 66 of the protruding insert 65 of the front side in the front-rear direction 8 makes a contact with the upper surface of the guide rail 92, and a fourth position (FIG. 13B) at which the stiffening rib 64 makes a contact with the lower surface of the guide rail 92.

When the contact member 60 is at the third position, a lower end (front end in the front-rear direction 8) of the contact rib 63A is positioned at a lower side of the upper end of the supporting rib 51. When the contact member 60 is at the fourth position, the lower end of the supporting rib 63A is positioned at an upper side of the upper end of the supporting rib 51. A coil spring 115 is arranged between a front-end portion of the fitting portion 61 and the guide rail 92. The coil spring 115 applies bias to the contact member 60 toward the third position (downward direction).

As the sheet 6 such as a glossy paper which is hard to bend (FIG. 10B) is transported, the contact member 60 is pivoted (turned) from the third position to the fourth position by the sheet 6. The sheet 6 positions the contact member 60 at the fourth position, and is transported without being made to be wave-shaped. The contact member 60 which was pivoted or turned to the fourth position, after passing of the sheet 6, returns to the third position due to the bias of the coil spring 115.

At the time of transporting the sheet 6 such as a cardboard which is thicker than the regular paper, the contact member 60 is turned to a position between the third position and the fourth position. The sheet 6, similarly as in the case in which the wave-shape is depicted by the solid line of FIG. 12A, is transported upon assuming a wave-shape which is gentler with smaller amplitude of wave than in the case of a regular paper depicted by a dashed-line.

In the sixth modified embodiment, since the contact members 60 and 70 are pivoted according to the thickness of the sheet 6 or susceptibility of the sheet 6 to bending, it is possible to record an image by transporting the sheet 6 without being particular about the thickness of the sheet 6 or susceptibility of the sheet 6 to bending.

In the sixth modified embodiment, an example in which the contact portions 63 and 73 are displaced vertically by pivoting has been described. However, the contact members 60 and 70 may be provided to be movable entirely in the up-down direction 7 while maintaining a horizontal state.

Other Modified Embodiments

In the abovementioned embodiment, an example in which the storage section 86 is formed by the first surface 81 and the surrounding rib 84 has been described. However, the ink storage section may be formed by an ink absorbing member which absorbs ink, such as a sponge stuck to the first surface 81. The ink which has run down the protruding rib 83 is held upon being absorbed by the ink absorbing member. Moreover, instead of providing the rib 85, the bumps 88A, and the recesses 88B to the first surface 81, the ink absorbing member may be arranged at the inner side of the surrounding rib 84.

In the abovementioned embodiment, an example in which two types of contact members namely, the contact member 60 and the contact member 70 are used, has been described. However, only one of the contact members 60 or the contact member 70 may be used.

In the abovementioned embodiment, an example in which the protruding rib 83 is provided to be extended to be inclined downward has been described. However, a boss in the form of a rod which is protruded upward may be provided as the protruding rib 83, provided that the strength is secured.

In the abovementioned embodiment, an example in which the contact members 60 and 70 are installed on the guide rail 92 by using the protruding inserts 65 and 75 respectively has been described. However, the contact members 60 and 70 may be fixed to the guide rail 92 by using fixing members such as screws. Moreover, the guide rail 92 and the contact members 60 and 70 may also be molded integrally by a resin (material).

In the abovementioned embodiment, an example in which the contact member 60 is provided with the guide ribs 69A and 63A, has been described. However, the contact member 60 may not be provided with the guide ribs 69A and 63A. In this case, the sheet 6 is guided to the contact portion 63 by the guide surface 69. Moreover, the sheet 6 is pressed by the lower surface of the contact portion 63. Same arrangement is to be made for the contact member 70.

In the abovementioned embodiment, an example in which the transporting path 31 has the curved path 32 has been described. However, the transporting path 31 may include only the straight path 33.

Except for unperformable cases, it is also possible to appropriately combine the abovementioned embodiment and one or more modifications as necessary.

What is claimed is:

1. An ink-jet recording apparatus comprising:

a roller pair configured to nip a sheet therebetween at a nip point and transport the sheet in a transporting direction, the roller pair including a first roller having a rotational axis located above the nip point in an up-down direction, and a second roller having a rotational axis located below the nip point in the up-down direction;

a rotating shaft for rotating the first roller;

a recording portion including a head in which nozzles that discharge ink are open, and a carriage mounting the head and configured to move in a width direction perpendicular to the transport direction and the up-down direction, the recording portion being provided downstream of the nip point of the roller pair in the transporting direction;

a first member including:

a first portion located above the first roller in the up-down direction;

a second portion located downstream of the first roller in the transporting direction; and a third portion connecting the first portion and the second portion, the first portion, the second portion and the third portion being formed integrally; and a storage portion provided on an upper surface of the first member and configured to store ink, wherein the first portion is attached to a second member other than the recording portion, the second portion is located downstream of a downstream end of the second roller in the transporting direction, and the sheet is transported below the second portion, the first portion overlaps a portion of the first roller in the up-down direction, and a clearance is formed between the third portion and the carriage so that the carriage does not contact the third portion in a case that the carriage moves in the width direction.

2. The ink-jet recording apparatus according to claim 1 further comprising:

a platen in a form of a plate, the platen being provided below the recording portion and downstream of each roller of the roller pair in the transporting direction, wherein the platen is configured to support the sheet and is spaced from the recording portion in the up-down direction orthogonal to the transporting direction and parallel to a direction of a thickness of the plate, wherein the second portion is positioned in a gap between the recording portion and the platen, wherein the sheet is transported between a lower surface of the second portion and the platen, the second portion includes a protruding portion positioned at the gap, and the protruding portion is positioned at a central portion of an upper surface of the second portion in a width direction perpendicular to the transporting direction.

3. The ink-jet recording apparatus according to claim 1, wherein the downstream end of the second portion is positioned upstream of the nozzles in the transporting direction.

4. The ink-jet recording apparatus according to claim 3, wherein the downstream end of the second portion is disposed closely to the nozzles in the transporting direction.

5. The ink-jet recording apparatus according to claim 1, wherein the second portion is inclined such that the downstream end of the second portion is located lower than an upstream end of the second portion.

6. The ink-jet recording apparatus according to claim 2, wherein the second portion extends toward the platen.

7. The ink-jet recording apparatus according to claim 1, wherein the second portion is composed of an elastic material.

8. The ink-jet recording apparatus according to claim 1, wherein a width of the second portion, in a width direction perpendicular to the transporting direction, decreases toward a downstream end with respect to the transporting direction.

9. The ink-jet recording apparatus according to claim 2, wherein the protruding portion extends along the transporting direction.

10. The ink-jet recording apparatus according to claim 1, further comprising:

a support member configured to support the recording portion; and a member including the second portion, wherein the member is disposed on the support member.

11. The ink-jet recording apparatus according to claim 1, further comprising a plurality of second portions arranged in a widthwise direction perpendicular to the transporting direction, each of the plurality of second portions including corresponding protruding portion.

12. The ink-jet recording apparatus according to claim 2, wherein in a condition in which the recording portion and the second portion are relatively moved closer to each other, the protruding portion contacts the recording portion.

13. The ink-jet recording apparatus according to claim 1, wherein the first member and the first roller are not configured to move in the up-down direction in conjunction with each other.

* * * * *